United States Patent [19]

Broadbent

[11] Patent Number: 5,011,715

[45] Date of Patent: Apr. 30, 1991

[54] TWO STAGE METHOD FOR OPERATING AUTODEPOSITION BATH

[75] Inventor: Ronald W. Broadbent, Horsham, Pa.

[73] Assignee: Henkel Corporation, Ambler, Pa.

[21] Appl. No.: 542,674

[22] Filed: Jun. 22, 1990

Related U.S. Application Data

[63] Continuation of Ser. No. 287,197, Dec. 20, 1988, abandoned.

[51] Int. Cl.$^5$ .............................................. C23C 26/00
[52] U.S. Cl. ................... 427/443.1; 427/435; 427/302
[58] Field of Search ............... 427/443.1, 435, 302, 427/304, 305, 306

[56] References Cited

U.S. PATENT DOCUMENTS

| | | | |
|---|---|---|---|
| 3,329,587 | 7/1967 | Steinbrecher et al. | 204/1 |
| 3,592,699 | 7/1971 | Steinbrecher et al. | 148/6.2 |
| 3,617,368 | 11/1971 | Gibbs | 428/336 |
| 3,795,546 | 3/1974 | Hall | 427/435 |
| 3,960,610 | 6/1976 | Steinbrecher | 427/435 |
| 4,186,219 | 1/1980 | Hall | 427/435 |
| 4,229,492 | 10/1980 | Leister | 427/435 |
| 4,357,372 | 11/1982 | Leister | 427/435 |
| 4,373,050 | 2/1983 | Steinbrecher | 427/435 |
| 4,411,937 | 10/1983 | Nishida | 427/435 |
| 4,414,350 | 11/1983 | Hall | 427/435 |
| 4,632,851 | 12/1986 | Broadbent | 427/435 |
| 4,657,788 | 4/1987 | Benton | 427/435 |

FOREIGN PATENT DOCUMENTS 132828 2/1985 European Pat. Off. ............ 427/435

*Primary Examiner*—Shrive Beck
*Assistant Examiner*—Vi Duong Dang
*Attorney, Agent, or Firm*—Ernest G. Szoke; Wayne C. Jaeschke; Norvell E. Wisdom, Jr.

[57] ABSTRACT

An autodeposition bath for coating steel and similar metals is operated initially with a low content of dissolved iron and at a high oxidizing potential. After the iron content has increased beyond a specific level, such as 1.5 g/l, the oxidizing potential is reduced. This permits continued satisfactory operation of the bath with lower rates of iron accumulation in the bath, so that the need for bath stabilization by removing dissolved iron is deferred.

20 Claims, No Drawings

TWO STAGE METHOD FOR OPERATING AUTODEPOSITION BATH

This application is continuation of application Ser. No. 287,197 filed on Dec. 20, 1988, now abandoned.

Field of the Invention

This invention relates to the use of liquid, usually aqueous, solutions or dispersions in which active metal surfaces of inserted objects are coated with an adherent polymer film that increases in thickness the longer the metal object remains in the bath, even though the liquid is stable for a long time against spontaneous precipitation or flocculation of any solid polymer, in the absence of contact with active metal. Such compositions are commonly denoted in the art, and in this specification, as "autodeposition" compositions, dispersions, emulsions, suspensions, baths, solutions, or a like term. Autodeposition is often contrasted with electrodeposition, which can produce very similar adherent films but requires that metal or other objects to be coated be connected to a source of direct current electricity for coating to occur.

DESCRIPTION OF RELATED ART

U.S. Pat. No. 3,592,699 of July 13, 1971 to Steinbrecher et al. is one of the early basic patents on autodeposition. It teaches autodeposition baths generally containing an appropriate polymer latex, an appropriate amount of a soluble oxidizing agent such as hydrogen peroxide or dichromate ion, fluoride ions, and sufficient acid to keep the pH within the range of about 2.5-3.5.

By the methods taught in this patent, very good quality coatings can be applied from a freshly prepared solution, without undue amounts of metal loss from the metal surfaces coated. However, it has been found that solutions formulated according to the teachings of this reference during prolonged use can accumulate substantial amounts of dissolved iron when used, as they usually are, to coat steel or other iron alloys. This accumulation of iron in a composition used for autodeposition, in the absence of any additional constituents that can moderate the effect of the soluble iron, promotes still more rapid dissolution of newly exposed metal surfaces to be coated, and eventually the operation of the solution ceases to be satisfactory. An early manifestation of the problem is a reduction in the thickness of the coatings from the levels previously achieved in the same amount of time, and often the formation of rust on the objects that should be coated. If the buildup or iron in the autodeposition composition is allowed to continue, the composition may flocculate, coagulate, or gel. Also, the rate of attack on inserted metal objects to be coated may become so high as to cause excessive loss of size of the objects during coating.

One method of avoiding some of these difficulties associated with prolonged use of the solutions taught by U.S. Pat. No. 3,592,699 is taught by U.S. Pat. No. 4,411,937 of Oct. 25, 1983 to Nishida et al. This teaches, in general terms, that soluble ferric ion may be used in lieu of other oxidants in the autodeposition baths, preferably with hydrofluoric acid. Such baths generally dissolve iron from the objects to be coated more slowly than those without ferric ions in solution, but eventually this type of bath also suffers deterioration from prolonged use.

A method of retarding the deterioration of baths initially containing fluoride ions was taught in U.S. Pat. No. 4,186,219 of Jan. 29, 1980 to Hall. In essence, this method consists of monitoring the redox potential of the autodeposition solution with the aid of an inert electrode such as platinum immersed in the solution and monitoring the concentration of HF with the aid of another instrument described in U.S. Pat. No. 3,329,587 and sold commercially as the Lineguard ® Meter 101, replenishing HF whenever its concentration as indicated by the 101 Meter falls below a certain level, and adding an oxidant such as hydrogen peroxide to the solution whenever the redox potential falls below a certain level. Potentials of at least 300 millivolts (mv), as measured between a platinum and a calomel electrode, were taught as preferable.

DESCRIPTION OF THE INVENTION

Except in the operating examples, or where otherwise explicitly indicated, all numerical quantities in this description indicating amounts of material or reaction conditions are to be understood as modified by the word "about".

It has now been found that autodeposition baths of generally conventional composition, initially without substantial amounts of dissolved iron, can advantageously be operated in two stages when used to deposit coatings on iron and iron alloy objects. During the first stage, sufficient dissolved oxidant is maintained in the bath to maintain the redox potential of the autodeposition bath, which can be measured by the voltage developed between a platinum electrode immersed in the bath and any reference electrode of known potential, which can be connected to the bath via any of several types of conventional salt bridges, at a level of at least 425 mv more oxidizing than a Ag-AgCl (sat'd) electrode.

The first stage of the process according to the invention is ended when the concentration of iron in the solution has reached a specific level, preferably 1.5 grams per liter (g/l). In the second stage, the level of soluble oxidant is reduced, so that the redox potential of the solution is maintained at no more than 375 mv more oxidizing than Ag-AgCl (sat'd). This is generally accomplished by reducing the rate of addition of soluble oxidant, such as hydrogen peroxide, to the autodeposition bath from the first to the second stage of operation.

It should be noted that it is not necessary actually to measure the oxidizing potential of the solution at all times in order to practice the invention. Once operating conditions, such as a rate of addition of oxidant per unit area of metal treated, that will produce an appropriate oxidizing potential have been established, the invention may be practiced by using such operating conditions, without the necessity of repeating the actual potential measurements by which suitable operating conditions were established. Similarly, the iron content need not necessarily be explicitly measured each time the oxidizing potential of the bath is changed in accordance with the invention, when prior experience has shown that the use of the bath up to the point of change has actually produced the requisite iron content.

By means of the control features of this invention, the adverse consequences associated in the prior art with the use of autodeposition bath compositions without any substantial amount of dissolved ferric iron can be avoided, without the need to provide expensive ferric compounds such as ferric fluoride in making up the initial autodeposition solutions. Long life of these solutions even during heavy use is also achieved.

Polymer dispersions, pigments, and other ingredients that will constitute the preponderance of the coatings to be formed according to this invention can be selected from among any of those generally known in the prior autodeposition art. Non-limiting examples of suitable polymers are given in column 3 lines 24-50 of U.S. Pat. No. 4,411,937, and column 7 lines 23-63 of the same patent give examples of optional ingredients such as pigments, coalescing agents, and surfactants or wetting agents. Additional non-limiting examples are described in column 3 line 53 to column 4 line 48 of U.S. Pat. No. 4,186,219. All these passages are hereby incorporated herein by reference.

A preferred constituent of the autodeposition baths used according to this invention is a latex made by copolymerizing (a) between 45 and 99 weight percent (hereinafter "w/o") of vinylidene chloride, (b) between 0.5 and 30 w/o of a relatively hydrophilic ethylenically unsaturated monomer that has a solubility of at least 1 w/o in each of water and vinylidene chloride at the temperature of polymerization, and (c) from 0.1 to 5 w/o of monomers selected from sulfonic acids and salts thereof having the formula $R-Z-(CH_2)_n-(SO_3)-M$, wherein R is either a vinyl or an $\alpha$-substituted vinyl radical; Z is a difunctional linking group that will activate the double bond present in R, e.g., a ketone, ester, or amide linkage; n is an integer between 1 and 4, and M is a cation. U.S. Pat. No. 3,617,368 gives additional examples and details about preparation of such copolymer latexes.

An acid is used in the baths according to this invention to maintain a sufficiently low pH for dissolution of the objects to be coated at a suitable, fairly low rate, so as to produce enough metal ions to effect a coating of the objects without excessively changing their dimensions. Typical, non-limiting examples of acids that can be used are acetic, formic, chloroacetic, trichloroacetic, sulfuric, nitric, phosphoric, hydrochloric, and hydrofluoric acids. Hydrofluoric acid is strongly preferred.

In the process according to this invention, metal substrates to be coated are brought into contact with the autodeposition bath under suitable conditions of temperature and time, the latter generally varying between fifteen seconds and ten minutes. The thickness of the coating formed increases with the time of contact, and for most typical industrial applications, a contact time of thirty seconds to five minutes will generally be effective.

The process according to the invention can be operated within a wide range of temperatures, with an operating temperature between 5° and 35° C. normally preferred and an operating temperature at a comfortable ambient temperature for humans, such as 15°-25° C. generally most preferred, primarily for reasons of economy in minimizing the need for heating or cooling equipment to be used with the process. Generally a modest change in the temperature of operation will not require any significant alteration of treating time or bath compositions.

Contact between the metal substrate to be treated and the autodeposition bath composition to be used in this invention can be effected by any of the normal methods such as spray, flow coating, or immersion, with the latter generally preferred.

After contact for an appropriate time to produce an adherent coating of the desired thickness on the substrate, conventional subsequent processing steps are used. These are described in general terms between line 28 of column 5 and line 23 of column 6 of U.S. Pat. No. 4,411,937, hereby incorporated herein by reference.

Any oxidizing agent may be used in the process according to this invention, provided that it has sufficient oxidizing power and solubility to provide the required redox potential as specified for the process and that neither the oxidizing agent itself, nor any product formed in the autodeposition bath by reducing it, causes coagulation or other destabilization of the autodeposition bath. Non-limiting examples of suitable oxidizing agents include dichromates, permanganates, persulfates, perborates, nitrates, and hydrogen peroxide, with the latter preferred.

It is preferred to make up all autodeposition bath compositions used in this invention with deionized, distilled, or otherwise purified water to assure exclusion of polyvalent metal ions, which can easily be present in typical industrial water supplies in sufficient concentrations to imperil the stability of the latexes normally used in the bath.

The operation of the invention may be further appreciated from the following working examples.

A preliminary study was made to determine the rate of film formation at various concentrations of acid and soluble oxidizer that could be suitable for the initial stage of the process according to this invention. For this study, baths were prepared from the following ingredients:

| | |
|---|---|
| Autophoretic ® Chemical 861 ("AC-861") | 96 grams |
| 20 weight % HF in water | X milliliters |
| 30 weight % $H_2O_2$ in water | Y milliliters |
| Deionized water to make one liter total. | |

AC-861 (Paint Concentrate) is available from the Parker + Amchem Division of Henkel Corporation, USA; the polymer in it is made by copolymerizing (a) between 45 and 99 w/o of vinylidene chloride, (b) between 0.5 and 30 w/o of an ethylenically unsaturated monomer that has a solubility of at least 1 w/o in each of water and vinylidene chloride at the temperature of polymerization, and (c) from 0.1 to 5 w/o of monomers selected from sulfonic acids and salts thereof having the formula $R-Z-(CH_2)_n-(SO_3)-M$, wherein R is either a vinyl or an $\alpha$-substituted vinyl radical; Z is a difunctional linking group that will activate the double bond present in R, e.g., a ketone, ester, or amide linkage; n is an integer between 1 and 4, and M is a cation. This latex also contains an alkylated diphenyl ether disulfonate surfactant and carbon black pigment, the latter to the extent of about 3 w/o of the solids in the product. The values of X and Y for the various baths are given in Table 1 below. A sample of steel having a total surface area of 929 $cm^2$ was immersed in each bath for a total of 1.5 minutes, then removed, allowed to hang for about one minute in the open air, rinsed with tap water for thirty to sixty seconds, rinsed with an ammonium bicarbonate solution, and dried in an oven at about 100° C. for about twenty minutes. The film thickness was then measured. The results are shown in Table 1.

TABLE 1

FILM THICKNESS ACCUMULATION RATE AS A FUNCTION OF CONCENTRATIONS OF ACID AND OXIDANT IN AUTODEPOSITION BATH

| X (= ml of 20% HF per Liter of Bath) | Y (= ml of 30% $H_2O_2$ per Liter of Bath) | Film Thickness, Microns |
|---|---|---|
| 5 | 0 | 1 |
| 5 | 1 | 12.7 |
| 5 | 2 | 15.5 |
| 5 | 3 | 18.0 |
| 5 | 4 | 20.3 |
| 5 | 5 | 22.4 |
| 0 | 2 | 13.7* |
| 1 | 2 | 48* |
| 2 | 2 | 16.5 |
| 3 | 2 | 17.8 |
| 4 | 2 | 15.7 |
| 5 | 2 | 15.7 |

Note for Table 1:
All the films formed were smooth and continuous except those marked with an asterisk.

Based on the data in Table 1, a value of 2.5 for X and 2.0 for Y was chosen as likely to provide a rate of film buildup that would not be overly sensitive to small changes in concentration of either the acid or oxidizer components and would not produce an undesirably high etch rate of the metal substrates to be coated. Accordingly, a bath with the same concentrations as would be obtained by using these values of X and Y in the composition table shown above was prepared and used for a protracted test of operation of a process according to this invention. During this test, the redox potential of the solution was continually monitored by measuring the potential difference between a smooth, clean platinum electrode immersed in the bath and a silver-saturated silver chloride electrode that was electrically connected to the bath via a porous junction made from wood and filled with a gelled electrolyte (a Leeds & Northrup Model 007351 Reference Electrode). The hydrofluoric acid concentration was sampled at intervals by removing a small portion of the bath and testing it in a Lineguard ® Meter 101, then returning the sample to the bath. Other samples were withdrawn from the bath at intervals and used to measure iron concentration and total dissolved solids. These samples were not returned to the bath, but their volume was small and was eventually compensated by the additions of reagents consumed during operations, all of which were added in solutions containing considerable water.

A succession of steel samples, each having the same surface area, were immersed in the bath, which was kept at ambient temperature of about 25° C., for a residence time of 1.5 minutes each. At least two samples were used during each interval. One sample during each interval was then withdrawn from the bath, conditioned in air, rinsed, and subsequently treated as already described for the preliminary measurements, including a measurement of film thickness. One other sample from the same interval, which had been accurately weighed before being inserted into the bath, was removed from the bath, immediately plunged into water, scrubbed with a soft implement to remove any remaining film, and again accurately weighed after normal rinsing and drying, to determine the amount of metal lost during the period of autodeposition.

At certain points during the tests, various amounts of replenishment latex, acid, and/or oxidizer were added, as described in detail in Table 2 and the discussion following it.

TABLE 2

QUANTITATIVE DATA DURING PROTRACTED OPERATION OF PROCESSES ACCORDING TO THE INVENTION

| Interval No. | Redox Potential, Millivolts | 101 Meter Reading | Weight % Total Solids in Bath | Dissolved Iron in Bath, g/l | Etch Rate ($mg/M^2/sec$) | Film Thickness, $\mu M$ | Replenishment Added by End of Interval, Milliliters per Liter of Bath Volume: | | |
|---|---|---|---|---|---|---|---|---|---|
| | | | | | | | LAT | ACD | OXI |
| 0.3 | 504 | 300 | 4.7 | <0.01 | 7.9 | 14.5 | — | — | — |
| 1 | 530 | 235 | 4.5 | 0.07 | 6.7 | 14.5 | 11 | 0.8 | — |
| 2 | 533 | 300 | 4.8 | 0.15 | 6.6 | 14.7 | 4 | 0.7 | — |
| 3 | 533 | 330 | 4.7 | 0.23 | 6.3 | 13.2 | 8 | — | — |
| 4 | 536 | 280 | 4.8 | 0.30 | 9.0 | 12.7 | 4 | 0.2 | — |
| 5 | 532 | 270 | 4.8 | 0.38 | 3.3 | 13.0 | 6 | 0.2 | — |
| 6 | 500 | 275 | 4.8 | 0.41 | 1.7 | 12.4 | 4 | 0.4 | — |
| 7 | 475 | 280 | nm | 0.42 | 2.0 | 12.2 | 4 | 0.2 | 2 |
| 8 | 535 | 360 | 4.8 | 0.49 | 9.5 | 15.7 | 4 | 0.2 | — |
| 9 | 532 | nm | nm | 0.61 | 7.6 | 15.7 | 4 | 0.2 | — |
| 10 | 532 | 260 | 4.6 | 0.68 | 5.3 | 14.7 | 8 | 0.2 | — |
| 11 | 520 | 245 | 4.8 | 0.70 | 3.0 | 14.0 | 6 | 0.4 | — |
| 12 | 498 | 240 | 4.8 | 0.71 | 3.5 | 12.7 | 4 | 0.4 | 2 |
| 13 | 525 | 330 | 4.8 | 0.86 | 10.4 | 15.7 | 4 | — | 0.33 |
| 14 | 530 | 310 | 4.8 | 0.86 | 10.1 | 15.7 | 6 | 0.5 | 0.33 |
| 15 | 523 | 250 | 4.8 | 0.94 | 5.0 | 15.7 | 4 | 0.4 | 0.33 |
| 16 | 521 | 280 | 4.7 | 0.98 | 4.2 | 16.5 | 6 | 0.2 | 0.33 |
| 17 | 531 | 250 | 4.9 | 1.05 | 8.2 | 16.8 | 4 | 0.4 | 0.33 |
| 18 | 342 | 260 | 4.9 | 1.06 | 5.0 | 14.0 | 4 | 0.2 | 0.33 |
| 19 | 495 | 280 | 4.9 | 1.07 | 2.3 | 13.0 | 6 | 0.2 | 0.33 |
| 20 | 508 | 270 | 4.8 | 1.12 | 3.4 | 13.0 | 4 | 0.2 | — |
| 21 | 303 | 290 | 4.9 | 1.14 | 4.2 | 12.2 | 4 | 0.4 | 0.05 |
| 22 | 276 | 350 | 4.8 | 1.21 | 4.4 | 12.4 | 4 | — | 0.11 |
| 23 | 278 | 330 | 4.9 | 1.24 | 5.4 | 11.7 | 2 | 0.2 | 0.10 |
| 24 | 273 | 340 | 4.9 | 1.27 | 4.7 | 11.4 | 4 | — | 2.11 |
| 25 | 531 | 305 | 4.7 | 1.34 | 8.0 | 14.2 | 6 | — | — |
| 26 | 527 | 240 | 4.8 | 1.42 | 6.1 | 14.5 | 4 | 0.6 | — |
| 27 | 361 | 245 | 4.8 | 1.45 | 8.9 | 14.7 | 4 | 0.6 | — |
| 28 | 272 | 365 | 4.9 | 1.45 | 5.4 | 12.4 | 4 | 0.14 | — |
| 29 | 274 | 325 | 4.8 | 1.47 | 5.6 | 10.9 | 4 | 0.20 | 0.15 |
| 30 | 345 | 320 | 4.9 | 1.53 | 4.8 | 11.9 | 4 | 0.20 | 0.15 |
| 31 | 336 | 335 | 4.9 | 1.61 | 7.0 | 12.7 | 4 | 0.24 | 0.16 |
| 32 | 326 | 330 | 5.0 | 1.64 | 6.4 | 13.2 | 4 | 0.20 | 0.17 |

TABLE 2-continued
QUANTITATIVE DATA DURING PROTRACTED OPERATION OF PROCESSES ACCORDING TO THE INVENTION

| Interval No. | Redox Potential, Millivolts | 101 Meter Reading | Weight % Total Solids in Bath | Dissolved Iron in Bath, g/l | Etch Rate (mg/M$^2$/sec) | Film Thickness, μM | Replenishment Added by End of Interval, Milliliters per Liter of Bath Volume: | | |
|---|---|---|---|---|---|---|---|---|---|
| | | | | | | | LAT | ACD | OXI |
| 33 | 339 | 335 | 4.8 | 1.65 | 8.2 | 12.2 | 4 | 0.20 | 0.20 |
| 34 | 334 | 335 | 4.9 | 1.70 | 5.2 | 12.7 | — | — | — |

Notes for Table 2
1. During each interval, 929 cm$^2$ of steel surface was immersed in the bath.
2. In the replenishment column headings, LAT is an abbreviation for AC-861 Paint Concentrate; ACD is an abbreviation for 20 weight % HF solution in water; and OXI is an abbreviation for 30 weight % hydrogen peroxide solution in water. In the table entries, "—" stands for no addition and "nm" stands for "no measurement made".

In the first twelve intervals shown in Table 2, the amounts indicated in the Replenishment column were added at the end of the interval shown. During intervals 13 through 19, however, the oxidant replenishment was added continuously throughout the interval, in an effort to keep the redox potential as nearly constant as possible. As shown by the entries in the Redox Potential column, this effort was generally successful, except in the eighteenth interval, when an unexplained drop, which may represent simply experimental error, occurred.

In the twentieth interval, replenishment of oxidant was deliberately diminished substantially, to let the redox potential fall. The redox potential remained below 310 mv from the 21st to the end of the 24th interval, when a large amount of oxidant was added to bring the potential above 500 mv again. The redox potential remained above 500 mv for the 26th interval but was below 300 mv again by the 28th interval, as no more oxidant was added in this period. Beginning in the 29th interval, additions of oxidant were resumed, at a rate intended to keep the redox potential in the range 330–350. This effort was successful, as shown in the Table.

The rate of increase of iron in the bath was noticeably lower during intervals when the redox potential was always below 375 mv.

All the panels coated during the operation of the process described in Table 2, except those deliberately post treated to remove the coating, had good corrosion resistance as measured by a conventional neutral salt spray test procedure.

What is claimed is:

1. A method of operating an autodeposition bath, comprising the steps of:
   (a) providing a bath comprising (i) stable, autodepositable polymer, (ii) acid in sufficient quantity to maintain the pH of the bath at not more than about 4, (iii) a soluble oxidant in sufficient quantity to maintain the redox potential of the bath at least about 425 mv more oxidizing than a silver-saturated silver chloride electrode, and (iv) a concentration of soluble iron less than a specific value;
   (b) contacting the bath provided in step (a) with ferriferous active metal surface, so as to cause autodeposition of polymer thereon and to cause the concentration of soluble iron in the bath to increase, while simultaneously maintaining the redox potential of the bath at least about 425 mv more oxidizing than a silver-saturated silver chloride electrode by supplying additional soluble oxidant to the bath as needed, until the concentration of soluble iron in the bath exceeds said specific value; and
   (c) contacting the bath, after completion of step (b), with additional amounts of ferriferous active metal surface, so as to cause autodeposition of polymer on the active metal surface from the bath while simultaneously maintaining the redox potential of the bath at a value not less than about 272 mv and not more than about 375 mv more oxidizing than a silver-saturated silver chloride electrode by supplying additional soluble oxidant to the bath as needed,
   wherein the average rate of increase of soluble iron in the bath, per unit area of active metal coated, during step (c) of the process is less than during step (b).

2. A process according to claim 1, wherein the rate of autodeposition film thickness formation on the active metal surface contacted with the bath during the process is between about 11 and about 23 microns per 90 seconds of exposure of metal to the bath.

3. A process according to claim 2, wherein said autodeposition bath contains a sufficient quantity of hydrofluoric acid to yield a reading between about 240 and about 365 on a Lineguard ® 101 meter during the operation of the process.

4. A process according to claim 1, wherein said autodeposition bath contains a sufficient quantity of hydrofluoric acid to yield a reading between about 240 and about 365 on a Lineguard ® 101 meter during the operation of the process.

5. A process according to claim 4, wherein the soluble oxidant is predominantly hydrogen peroxide.

6. A process according to claim 3, wherein the soluble oxidant is predominantly hydrogen peroxide.

7. A process according to claim 2, wherein the soluble oxidant is predominantly hydrogen peroxide.

8. A process according to claim 1, wherein the soluble oxidant is predominantly hydrogen peroxide.

9. A process according to claim 8, wherein the bath polymer predominantly comprises copolymers of (a) between about 45 and about 99 weight % of vinylidene chloride, (b) between about 0.5 and about 30 weight % of an unsaturated monomer that has a solubility of at least 1 weight % in each of water and vinylidene chloride at the temperature of polymerization, and (c) between about 0.1 and about 5 weight % of monomers selected from sulfonic acids and salts thereof having the formula R—Z—(CH$_2$)$_n$—(SO$_3$)—M, wherein R is either a vinyl or an α-substituted vinyl radical, Z is a difunctional linking group that will activate the double bond present in R, n is an integer between 1 and 4, and M is a cation.

10. A process according to claim 7, wherein the bath polymer predominantly comprises copolymers of (a) between about 45 and about 99 weight % of vinylidene chloride, (b) between about 0.5 and about 30 weight % of an unsaturated monomer that has a solubility of at least 1 weight % in each of water and vinylidene chloride at the temperature of polymerization, and (c) between about 0.1 and about 5 weight % of monomers selected from sulfonic acids and salts thereof having the formula $R-Z-(CH_2)_n-(SO_3)-M$, wherein R is either a vinyl or an α-substituted vinyl radical, Z is a difunctional linking group that will activate the double bond present in R, n is an integer between 1 and 4, and M is a cation.

11. A process according to claim 6, wherein the bath polymer predominantly comprises copolymers of (a) between about 45 and about 99 weight % of vinylidene chloride, (b) between about 0.5 and about 30 weight % of an unsaturated monomer that has a solubility of at least 1 weight % in each of water and vinylidene chloride at the temperature of polymerization, and (c) between about 0.1 and about 5 weight % of monomers selected from sulfonic acids and salts thereof having the formula $R-Z-(CH_2)_n-(SO_3)-M$, wherein R is either a vinyl or an α-substituted vinyl radical, Z is a difunctional linking group that will activate the double bond present in R, n is an integer between 1 and 4, and M is a cation.

12. A process according to claim 5, wherein the bath polymer predominantly comprises copolymers of (a) between about 45 and about 99 weight % of vinylidene chloride, (b) between about 0.5 and about 30 weight % of an unsaturated monomer that has a solubility of at least 1 weight % in each of water and vinylidene chloride at the temperature of polymerization, and (c) between about 0.1 and about 5 weight % of monomers selected from sulfonic acids and salts thereof having the formula $R-Z-(CH_2)_n-(SO_3)-M$, wherein R is either a vinyl or an α-substituted vinyl radical, Z is a difunctional linking group that will activate the double bond present in R, n is an integer between 1 and 4, and M is a cation.

13. A process according to claim 4, wherein the bath polymer predominantly comprises copolymers of (a) between about 45 and about 99 weight % of vinylidene chloride, (b) between about 0.5 and about 30 weight % of an unsaturated monomer that has a solubility of at least 1 weight % in each of water and vinylidene chloride at the temperature of polymerization, and (c) between about 0.1 and about 5 weight % of monomers selected from sulfonic acids and salts thereof having the formula $R-Z-(CH_2)_n-(SO_3)-M$, wherein R is either a vinyl or an α-substituted vinyl radical, Z is a difunctional linking group that will activate the double bond present in R, n is an integer between 1 and 4, and M is a cation.

14. A process according to claim 3, wherein the bath polymer predominantly comprises copolymers of (a) between about 45 and about 99 weight % of vinylidene chloride, (b) between about 0.5 and about 30 weight % of an unsaturated monomer that has a solubility of at least 1 weight % in each of water and vinylidene chloride at the temperature of polymerization, and (c) between about 0.1 and about 5 weight % of monomers selected from sulfonic acids and salts thereof having the formula $R-Z-(CH_2)_n-(SO_3)-M$, wherein R is either a vinyl or an α-substituted vinyl radical, Z is a difunctional linking group that will activate the double bond present in R, n is an integer between 1 and 4, and M is a cation.

15. A process according to claim 2, wherein the bath polymer predominantly comprises copolymers of (a) between about 45 and about 99 weight % of vinylidene chloride, (b) between about 0.5 and about 30 weight % of an unsaturated monomer that has a solubility of at least 1 weight % in each of water and vinylidene chloride at the temperature of polymerization, and (c) between about 0.1 and about 5 weight % of monomers selected from sulfonic acids and salts thereof having the formula $R-Z-(CH_2)_n-(SO_3)-M$, wherein R is either a vinyl or an α-substituted vinyl radical, Z is a difunctional linking group that will activate the double bond present in R, n is an integer between 1 and 4, and M is a cation.

16. A process according to claim 1, wherein the bath polymer predominantly comprises copolymers of (a) between about 45 and about 99 weight % of vinylidene chloride, (b) between about 0.5 and about 30 weight % of an unsaturated monomer that has a solubility of at least 1 weight % in each of water and vinylidene chloride at the temperature of polymerization, and (c) between about 0.1 and about 5 weight % of monomers selected from sulfonic acids and salts thereof having the formula $R-Z-(CH_2)_n-(SO_3)-M$, wherein R is either a vinyl or an α-substituted vinyl radical, Z is a difunctional linking group that will activate the double bond present in R, n is an integer between 1 and 4, and M is a cation.

17. A process according to claim 16, wherein the autodeposition bath comprises between about 3 and about 6 w/o of polymer solids, between about 0.2 and about 0.4 w/o of pigment solids, and between about 0.3 and about 0.8 w/o of HF, and said specific value of iron concentration is about 1.5 g/l.

18. A process according to claim 14, wherein the autodeposition bath comprises between about 3 and about 6 w/o of polymer solids, between about 0.2 and about 0.4 w/o of pigment solids, and between about 0.3 and about 0.8 w/o of HF, and said specific value of iron concentration is about 1.5 g/l.

19. A process according to claim 8, wherein the autodeposition bath comprises between about 3 and about 6 w/o of polymer solids, between about 0.2 and about 0.4 w/o of pigment solids, and between about 0.3 and about 0.8 w/o of HF, and said specific value of iron concentration is about 1.5 g/l.

20. A product produced by a process according to claim 1.

* * * * *